US010110316B2

United States Patent
Shi

(10) Patent No.: US 10,110,316 B2
(45) Date of Patent: Oct. 23, 2018

(54) OLT OPTICAL MODULE AND OLT

(71) Applicants: Hisense Broadband Multimedia Technologies Co., Ltd., Qingdao (CN); Hisense Broadband Multimedia Technologies, Ltd., Tortola (VG)

(72) Inventor: Liang Shi, Qingdao (CN)

(73) Assignees: Hisense Broadband Multimedia Technologies Co., Ltd., Qingdao (CN); Hisense Broadband Multimedia Technologies, Ltd., Tortola (VG)

( * ) Notice: Subject to any disclaimer, the term of this patent is extended or adjusted under 35 U.S.C. 154(b) by 81 days.

(21) Appl. No.: 15/426,502

(22) Filed: Feb. 7, 2017

(65) Prior Publication Data
US 2018/0083713 A1 Mar. 22, 2018

(30) Foreign Application Priority Data
Sep. 18, 2016 (CN) .......................... 2016 1 0829086

(51) Int. Cl.
*H04B 10/27* (2013.01)
*H04B 10/60* (2013.01)
*H04B 10/80* (2013.01)

(52) U.S. Cl.
CPC ............. *H04B 10/60* (2013.01); *H04B 10/27* (2013.01); *H04B 10/801* (2013.01)

(58) Field of Classification Search
CPC ...... H04B 10/60; H04B 10/27; H04B 10/801; H04B 10/272; H04J 14/0282; H04J 14/0226; H04Q 11/0067; H04N 7/22
See application file for complete search history.

(56) References Cited

U.S. PATENT DOCUMENTS

| 2009/0142074 A1* | 6/2009 | Ide ........................ H04B 10/69 398/202 |
| 2013/0259471 A1* | 10/2013 | Wang ............... H04B 10/07955 398/38 |

FOREIGN PATENT DOCUMENTS

| CN | 101335571 A | 12/2008 |
| CN | 203632673 U | 6/2014 |
| EP | 1039665 A2 | 9/2000 |

OTHER PUBLICATIONS

First Office Action to Chinese Application No. 201610829086.8 dated Apr. 16, 2018, and English concise explanation, 5p.

* cited by examiner

*Primary Examiner* — Ted Wang
(74) *Attorney, Agent, or Firm* — Brinks Gilson & Lione

(57) ABSTRACT

An Optical Line Termination (OLT) module and an OLT are disclosed. According to an embodiment of the OLT optical module, an optical signal receiver connects with a trans-impedance amplifier of which differential outputs connect with a limiting amplifier. An SD output of the limiting amplifier connects with a clock input of a D trigger and an input of a micro control unit. The D trigger connects with a control signal input of a first switch tube and may cause the first switch tube to be in conducting state when outputting high level. When the optical signal receiver detects an uplink burst signal, the limiting amplifier may generate the SD signal, the D trigger may output high level according to the SD signal and the first switch tube will be in conducting state, so that the micro control unit may detect the received optical power of the uplink burst signal.

15 Claims, 3 Drawing Sheets

OLT OPTICAL MODULE AND OLT

CROSS REFERENCE TO RELATED APPLICATIONS

This application claims priority to Chinese Patent Application No. 201610829086.8 filed on Sep. 18, 2016, which is incorporated herein by reference in its entirety.

TECHNICAL FIELD

The present disclosure relates to an optical line termination (OLT) optical module and OLT.

BACKGROUND

A Passive Optical Network (PON), as an optical access system, usually comprises an OLT located in a central office, a plurality of Optical Network Units (ONUs) located at a user side and an optical distribution network located between the OLT and the ONUs. The ONUs may operate in a time division multiplexing mode. For example, the OLT may control each one of the ONUs to send an uplink burst signal at different time slots. As external disturbance may also exist in an optical fiber line, in order to accurately receive an uplink burst signal sent by an ONU, the OLT may sample optical power of the uplink burst signal from the ONU based on an Received Signal Strength Indicator (RSSI) and may also determine the received optical power value. For example, if the received optical power value is in a proper threshold range, it may determine that the received signal is an uplink burst signal. Because of different distances between the ONUs and the OLT, the OLT may further adjust a receiving threshold of uplink burst signal according to the received optical power value.

An OLT may comprise an OLT system device and an OLT optical module. After an ONU is successfully registered in the OLT, the OLT system device may control the ONU to send an uplink burst signal in an assigned time slot, and a Media Access Control (MAC) chip of the OLT system device may send a MAC_Trigger signal to the OLT optical module in the corresponding time slot. Accordingly, the OLT optical module may sample optical power of a received uplink burst signal according to the MAC_Trigger signal. However, if attenuation of an optical link between the ONU and the OLT is too high or too low, the ONU may be failed to be registered in the OLT. When the ONU is failed to be registered, the OLT system device may not send the MAC_Trigger signal to the OLT optical module, so that the OLT optical module may be unable to sample the optical power of the uplink burst signal from the ONU.

SUMMARY

An OLT optical module and an OLT are provided according to embodiments of the present disclosure, wherein, the OLT optical module is enabled to sample optical power of an uplink burst signal from an ONU even if the OLT system device does not send a MAC_Trigger signal to the OLT optical module.

According to a first aspect of the present disclosure, an OLT optical module is provided. The OLT optical module comprises: an optical signal receiver configured to receive an uplink burst signal sent by an ONU; a trans-impedance amplifier comprising an input connected with the optical signal receiver; a limiting amplifier comprising an input pin connected with differential outputs of the trans-impedance amplifier; a D trigger comprising a clock pin connected with a SD output pin of the limiting amplifier; a micro control unit comprising an input pin connected with the SD output pin of the limiting amplifier and an output pin connected with a reset pin of the D trigger; a first switch tube comprising a control signal input connected with an output pin Q of the D trigger; a mirror current chip comprising an input connected with the optical signal receiver and an output connected with the input of the first switch tube; and a sample and hold circuit comprising an input connected with the output of the first switch tube and an output connected with a sample input of the micro control unit.

According to a second aspect of the present disclosure, an OLT is provided. The OLT comprises an OLT system device and the OLT optical module provided according to the above first aspect, wherein the OLT system device is connected with the OLT optical module via a bus.

By providing an OLT optical module with a detecting mechanism comprising components such as a D trigger, a micro control unit, a first switch tube and a mirror current chip and the like, a SD signal output from a limiting amplifier may trigger the D trigger to conduct the first switch tube even if the OLT optical module does not receive a MAC_Trigger signal, and thus a sample and hold circuit and the micro control unit may sample optical power of an optical signal received by an optical signal receiver in the OLT optical module.

BRIEF DESCRIPTION OF DRAWINGS

In order to illustrate the technical solutions of the embodiments of the present disclosure more clearly, the drawings required to be used in description of the embodiments are briefly introduced below. Apparently, the drawings described below are only some embodiments of the present disclosure. Anyone skilled in the art may acquire other drawings according to those drawings under the precondition that creative labor is not contributed.

DETAILED DESCRIPTION

In order to enable the purposes, the technical solutions and the advantages of the present disclosure to be clearer, the embodiments of the present disclosure will be further described below in details with combination of the drawings.

Figure 1:
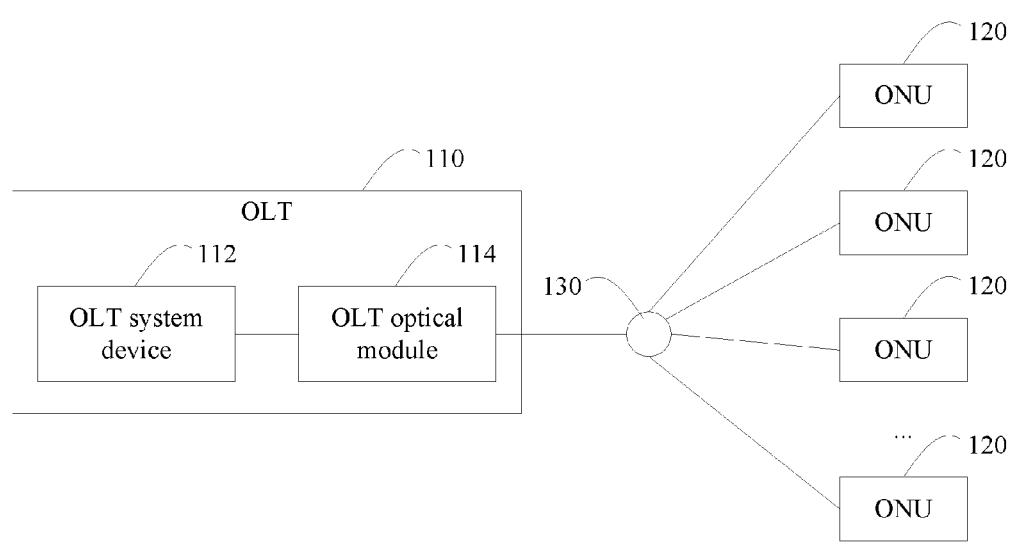
FIG. 1 is a structural schematic diagram of a PON provided according to one embodiment of the present disclosure.

Please refer to FIG. 1 showing a structural schematic diagram of a PON provided according to one embodiment of the present disclosure. The PON may comprise an OLT 110 and a plurality of ONUs 120.

The OLT 110 may be located in a central office; and the central office may be a building in which telecom operators are located. The OLT 110 comprises an OLT system device 112 and an OLT optical module 114. The OLT system device 112 may be connected with the OLT optical module 114 via a bus, for example, an IIC bus. The OLT system device 112 may function to achieve management, maintenance and distance measurement for the ONUs 120. The OLT optical module 114 may function to perform signal transformation between an optical signal and an electrical signal, send an optical signal, receive an optical signal and communicate with the OLT system device 112.

The OLT 110 and the ONUs 120 may be connected with each other via an Optical Distribution Network (ODN) 130. The ODN 130 may provide optical transmission mechanism between the OLT 110 and the ONUs 120, and function to distribute power of optical signals. The ODN 130 may be a passive optical distribution network constituted by passive optical components such as optical fiber cables, an optical connector and an optical splitter and the like. Schematically, the ODN 130 may comprise an optical splitter; and the OLT 110 may be connected with 32, 64 or 128 ONUs 120 via the optical splitter.

The ONU 120 may be located at user side. For example, the ONU 120 may be an optical modem in a house of a user. The ONU 120 may be used for processing optical signals and providing service interfaces for a large number of small business users and residential housing users. Network side of the ONU 120 is an optical interface while user side of the ONU 120 is an electric interface. Therefore, the ONU 120 may be required to have optical/electric and electric/optical conversion functions. The ONU 120 may be generally connected with a device such as a telephone, a television set or a router and the like in the house of the user.

A newly-connected or off-line ONU 120 may need to be registered in the OLT 110. The registering process may be initiated and completed by the OLT 110. When the ONU 120 is successfully registered, the OLT 110 may distribute address information to the ONU 120, send downlink data to the ONU 120 and control the ONU 120 to send uplink data to the OLT 110.

When the OLT 110 sends downlink data to the ONU 120, the OLT 110 may broadcast the downlink data to each one of the ONUs 120. Each one of the ONUs 120 may receive downlink data related to itself according to its address information.

The ONU 120 may send uplink data to the OLT 110; and the uplink data may be an uplink burst signal, e.g., optical signal. As the uplink data may be of small data volume and low time regularity, the ONUs 120 may operate in a time division multiplexing mode. For example, the OLT 110 distributes a time slot to each one of the ONUs 120; and each one of the ONUs 120 may send uplink data to the OLT 110 in the distributed time slot.

Figure 2:
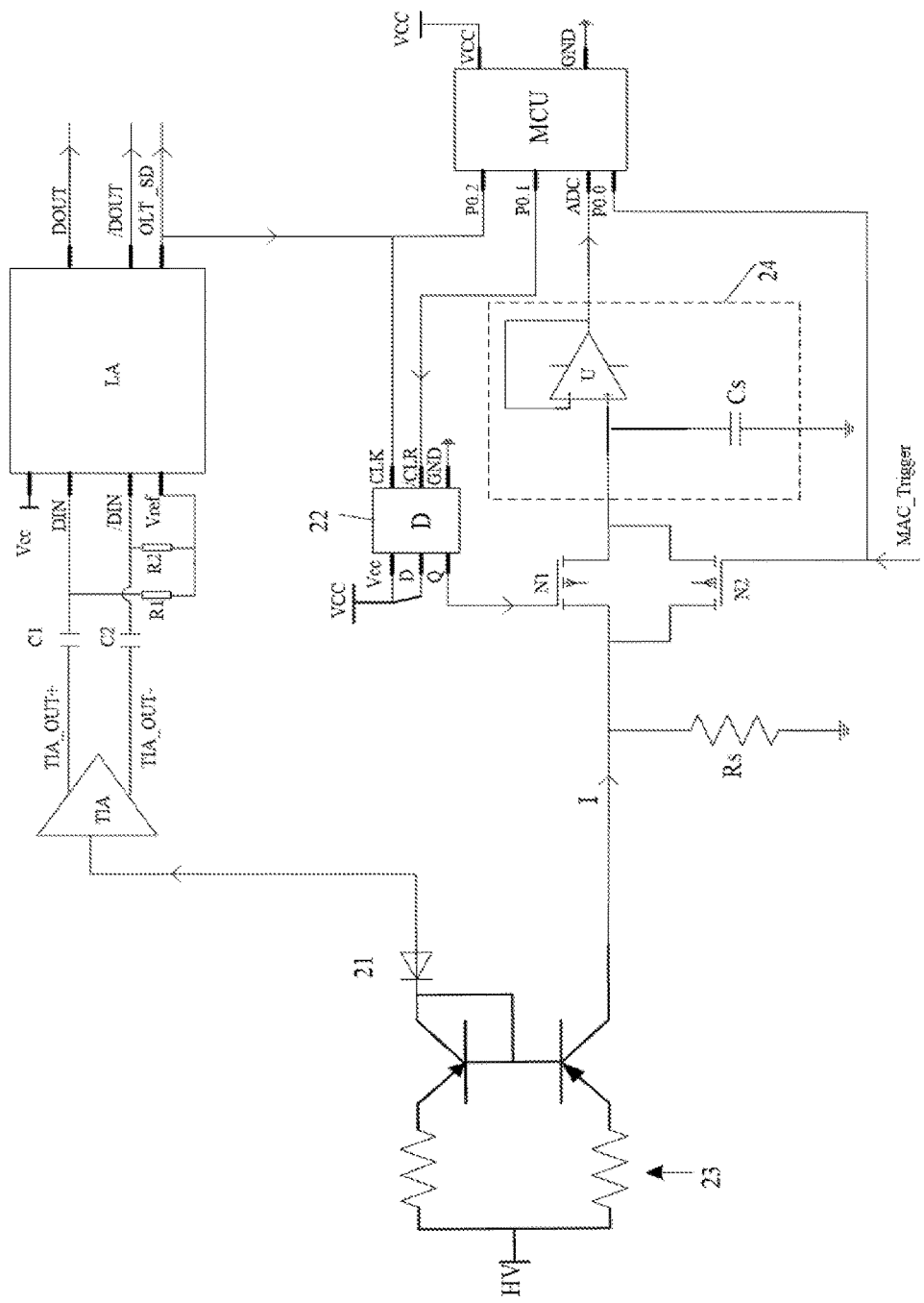
FIG. 2 is a structural schematic diagram of an OLT optical module provided according to one embodiment of the present disclosure.

Please refer to FIG. 2 showing a structural schematic diagram of an OLT optical module provided according to one embodiment of the present disclosure. The OLT optical module may be used as the OLT optical module 114 shown in FIG. 1. The OLT optical module may comprise an optical signal receiver 21, a trans-impedance amplifier TIA, a limiting amplifier LA, a D trigger 22, a micro control unit MCU, a first switch tube N1, a mirror current chip 23 and a sample and hold circuit 24.

The optical signal receiver 21 may be a PIN type photodiode or an Avalanche Photo Diode (APD). The optical signal receiver 21 may be connected with an input pin TIA_IN of the trans-impedance amplifier TIA.

The trans-impedance amplifier TIA may have two differential outputs TIA_OUT+ and TIA_OUT−. The two differential outputs TIA_OUT+ and TIA_OUT− of the trans-impedance amplifier TIA may be connected with an input pin DIN of the limiting amplifier LA. As shown in FIG. 2, the differential outputs of the trans-impedance amplifier TIA may be connected with the input pin DIN of the limiting amplifier LA via coupling capacitors. For example, one differential output pin TIA_OUT+ of the trans-impedance amplifier TIA may be connected with the input pin DIN of the limiting amplifier LA via a coupling capacitor C1; and the other differential output pin TIA_OUT− of the trans-impedance amplifier TIA may be connected with the input pin/DIN of the limiting amplifier LA via a coupling capacitor C2. In addition, the coupling capacitor C1 may further be connected with a reference voltage input pin Vref of the limiting amplifier LA via a resistor R1; and the coupling capacitor C2 may be further connected with the reference voltage input pin Vref of the limiting amplifier LA via a resistor R2.

An SD output pin of the limiting amplifier LA may be connected with a clock input pin CLK of the D trigger 22. The SD output pin of the limiting amplifier LA may also be connected with an input pin P0.2 of the micro control unit MCU. In addition, a power supply pin (not shown in the drawing) of the limiting amplifier LA may be connected with a power supply VCC; and two output pins (DOUT and/DOUT) of the limiting amplifier LA may be connected with the OLT system device.

According to an embodiment, the power supply pin Vcc of the D trigger may be connected with a power supply VCC; and a grounded pin GND of the D trigger may be grounded. An input pin D of the D trigger may be connected with the power supply VCC. An output pin Q of the D trigger 22 may be connected with a control signal input of the first switch tube N1. A reset signal input pin CLR of the D trigger 22 may be connected with an output pin P0.1 of the micro control unit MCU. In addition, the first switch tube N1 may be an NMOS tube.

The input of the mirror current chip 23 may be connected with the optical signal receiver 21. The output of the mirror current chip 23 may be connected with the input of the first switch tube N1. The other input of the mirror current chip 23 may be connected with a high voltage generator HV.

The output of the first switch tube N1 may be connected with an input of the sample and hold circuit 24. The output of the sample and hold circuit 24 may be connected with a sample input pin ADC of the micro control unit MCU.

According to an embodiment, the OLT optical module may further comprise a second switch tube N2 connected in parallel with the first switch tube N1. The input of the second switch tube N2 may be connected with the output of the mirror current chip 23. The output of the second switch tube N2 may be connected with the input of the sample and hold circuit 24.

According to an embodiment, the sample and hold circuit 24 may comprise a sampling capacitor Cs and an operational amplifier U. A first end of the sampling capacitor Cs may be connected with the output of the first switch tube N1 and the output of the second switch tube N2; and a second end of the sampling capacitor Cs may be grounded. A non-inverting input pin+ of the operational amplifier U may be connected with the first end of the sampling capacitor Cs; and an inverting input pin− of the operational amplifier U may be connected with the output of the operational amplifier U. The output of the operational amplifier U may also be connected with a sample input pin ADC of the micro control unit MCU.

According to an embodiment, the OLT optical module may further comprise a sampling resistor Rs. A first end of the sampling resistor Rs may be connected with the output of the mirror current chip 23; and a second end of the sampling resistor Rs may be grounded.

According to an embodiment, the power supply pin of the micro control unit MCU may be connected with a power supply VCC; and a grounded pin GND of the micro control unit MCU may be grounded. The other input pin P0.0 of the micro control unit MCU may be used for receiving a MAC_Trigger signal. For example, as shown in FIG. 2, the other input pin P0.0 of the micro control unit MCU may be connected with the control signal input of the second switch tube N2. The MAC_Trigger signal is a triggering signal sent to the OLT optical module by the OLT system device after an ONU is successfully registered.

The OLT optical module may operate in two different conditions comprising: I) an ONU is successfully registered in the OLT; and II) an ONU is failed to be registered in the OLT. When an ONU is successfully registered in the OLT, the optical signal receiver 21 will detect an optical signal and the OLT optical module will receive a MAC_Trigger signal. This will cause the second switch tube N2 to be conducting, and thus a sampling process may be implemented. On the other hand, when an ONU is failed to be registered in the OLT, the optical signal receiver 21 will detect an optical signal while the OLT optical module will not receive a MAC_Trigger signal. This will cause the first switch tube N1 to be conducting, and thus a sampling process may be implemented. The two conditions will be respectively illustrated below.

I) in the condition that an ONU is successfully registered in the OLT

A newly connected or disconnected ONU may request to be registered in the OLT. When the ONU is successfully registered in the OLT, the OLT may control an uplink sending process of the ONU. For example, the OLT system device of the OLT may distribute a time slot to the ONU for sending an uplink burst signal. When the OLT optical module of the OLT receives an uplink burst signal sent to the OLT by the ONU, the MAC chip in the OLT system device may send a MAC_Trigger signal to the OLT optical module according to a preset time sequence relationship so as to enable the OLT optical module to sample optical power of the received uplink burst signal. The MAC_Trigger signal may be a low-level effective signal.

The second switch tube N2 in the OLT optical module will be in conducting state after receiving the MAC_Trigger signal (a low-level signal). The optical signal receiver 21 may generate a response current Ipd when detecting the optical signal. The mirror current chip 23 may generate a mirror current I according to the response current Ipd, for example, the mirror current I may be a predetermined ratio to the response current Ipd. The second switch tube N2 in conducting state may output the mirror current I to the sample and hold circuit 24. For example, the sampling resistor Rs may convert the mirror current I into a charging voltage. Subsequently, the second switch tube N2 in conducting state may output the charging voltage into the sampling capacitor Cs in the sample and hold circuit 24, so that the sampling capacitor Cs is charged.

The MAC chip in the OLT system device may set the MAC_Trigger signal as high level after a predetermined time, for example 300 nanoseconds. The second switch tube N2 will be in cut-off state after the MAC_Trigger signal stops (being changed into high level), so that the sampling capacitor Cs will stop being charged. In this case, the sample and hold circuit 24 will enter a sample and hold state; and the voltage value cross the sampling capacitor Cs will be amplified by the operational amplifier U and then output to the micro control unit MCU. As the micro control unit MCU may also receive the MAC_Trigger signal through the input pin P0.0, the micro control unit MCU may sample the voltage signal amplified by the operational amplifier U after the MAC_Trigger signal is changed into high level. The micro control unit may further carry out an analog-digital conversion on the sampled result so as to obtain a received optical power value sampled this time according to the analog-digital conversion result. After the sampling is completed, the sampling capacitor Cs in the sample and hold circuit 24 will be discharged and return to the state before sampling.

II) in the condition that an ONU is failed to be registered in the OLT

If the attenuation of an optical link is too high or too low, an ONU may be failed to be registered in the OLT. In this case, the OLT system device may control the ONU to try to be registered again, and the ONU will send an uplink burst signal to the OLT again. Therefore, under this condition, the OLT optical module may need to sample the received optical power. However, the OLT system device will not send a MAC_Trigger signal to the OLT optical module before the ONU is successfully registered, so that the sampling of received optical power may not be realized by the second switch tube N2 as mentioned above.

Figure 3:
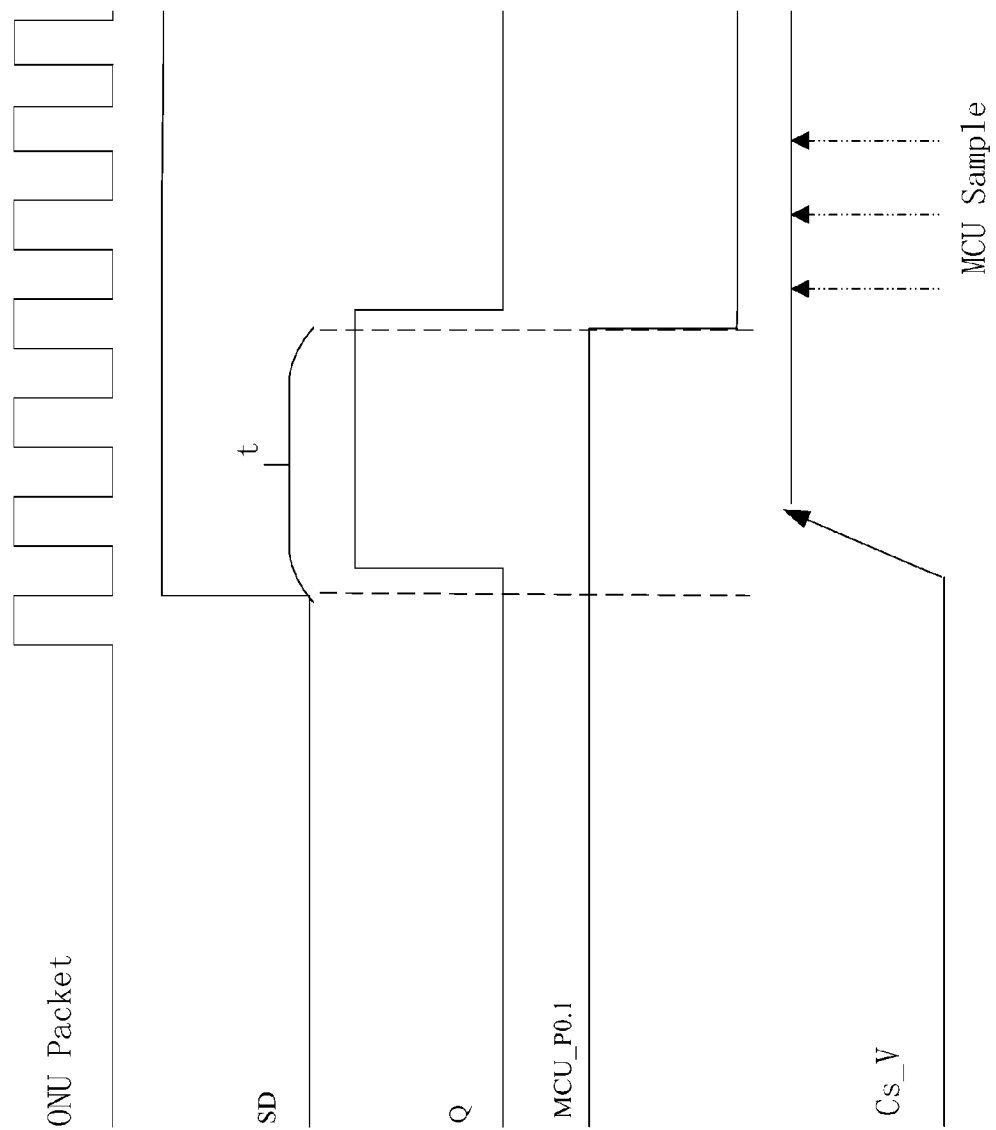
FIG. 3 is a signal timing sequence diagram in a burst signal detection process provided according to one embodiment of the present disclosure.

With reference to FIG. 3, the ONU sends an uplink burst signal ONU Packet to the OLT; the uplink burst signal ONU Packet may be an optical signal constituted by strong light indicating 1 and weak light indicating 0. The optical signal receiver 21 may generate a response current Ipd upon detecting the optical signal and the trans-impedance amplifier TIA may output differential electric signals according to the response current Ipd. The limiting amplifier LA may output a SD signal according to the differential electric signals. For example, the limiting amplifier LA may detect whether the amplitude of the differential electric signals is greater than a predetermined threshold. If the amplitude of the differential electric signals is greater than the predetermined threshold, the limiting amplifier LA will output the SD signal. If the amplitude of the differential electric signals is not greater than the predetermined threshold, the limiting amplifier LA will not output the SD signal. The SD signal can be output to the clock input pin CLK of the D trigger 22 and the input pin P0.2 of the micro control unit MCU. As shown in FIG. 3, the generating time of the SD signal may be slightly later than the receiving time of the uplink burst signal ONU Packet. The SD signal may be a high-level effective signal.

The D trigger 22 may control the first switch tube N1 to be in conducting state according to the SD signal. For example, when the clock input pin CLK of the D trigger 22 receives the SD signal, the rising edge from low level to high level of the SD signal may trigger the D trigger 22 to change an output signal of the output pin Q from low level to high level. The high level of the output pin Q may be output to the control signal input of the first switch tube N1 and enable the first switch tube N1 to be in conducting state.

According to an embodiment, the micro control unit MCU may also start timing according to the SD signal. For example, when the input pin P2.0 receives the SD signal, the rising edge from low level to high level of the SD signal may trigger the micro control unit MCU to start timing.

After the optical signal receiver 21 generates the response current Ipd, the mirror current chip 23 may generate the mirror current I according to the response current Ipd, for example, the mirror current I may be a predetermined ratio to the response current Ipd. The first switch tube N1 in conducting state may output the mirror current I to the sample and hold circuit 24. For example, the sampling resistor Rs may convert the mirror current I into a charging voltage, and the first switch tube N1 in conducting state may output the charging voltage to the sampling capacitor Cs in the sample and hold circuit 24, so that the sampling capacitor Cs is charged.

The micro control unit MCU may send a reset signal, for example an output signal MCU_P0.1 as shown in FIG. 3, to the reset signal input pin CLR of the D trigger 22 via the output pin P0.1 when the timing time reaches a threshold t. The D trigger 22 may control the first switch tube N1 to be in cut-off state according to the reset signal. For example, if the reset signal is a low-level effective signal, the D trigger 22 may carry out reset operation upon receiving the reset signal, so that the output signal of the output pin Q will be changed from high level to low level, as the output signal Q shown in FIG. 3. The first switch tube N1 will be in cut-off state upon receiving the low level output signal from the output pin Q, so that the sampling capacitor Cs will stop being charged. In this case, the sample and hold circuit 24 may enter the sample and hold state, and the voltage values cross the sampling capacitor Cs may be amplified by the operational amplifier U and then output to the micro control unit MCU. The voltage value cross the sampling capacitor Cs may be expressed by a voltage values Cs_V as shown in the FIG. 3.

In addition, when the timing time reaches the threshold t, the micro control unit MCU may sample the voltage signal amplified by the operational amplifier U and further carry out analog-digital conversion on the sampled result so as to obtain a received optical power value sampled this time according to the analog-digital conversion result. After the sampling is completed, the sampling capacitor Cs in the sample and hold circuit 24 may be discharged and return to the state before sampling.

According to an embodiment, the time duration of the uplink burst signal for registering the ONU in the OLT may be short, and thus the timing threshold t of the micro control unit MCU may be set a shorter time such as 300 ns.

In summary, by providing the OLT optical module with the D trigger 22, the D trigger 22 may cause the first switch tube N1 to be in conducting state upon receiving a SD signal generated by the limiting amplifier LA when optical signal receiver 21 detects an uplink burst optical signal, so that the sampling capacitor Cs in the sample and hold circuit 24 may be charged; meanwhile, the micro control unit MCU may start timing according to the SD signal and sample an amplified voltage cross the sampling capacitor Cs when the timing time reaches the threshold. In this way, the SD signal of the limiting amplifier LA may also trigger the D trigger 22 to conduct the first switch tube N1 even if the OLT optical module does not receive the MAC_Trigger signal sent by the OLT system device, so that the sample and hold circuit 24 and the micro control unit MCU may sample the optical power of optical signal received by the optical signal receiver 21.

In addition, as the micro control unit MCU can calculate and obtain received optical power value of uplink burst signal sent by an ONU even when the ONU is failed to be registered, the micro control unit MCU may further determine at a certain extent whether the failure of registration for the ONU is due to a higher or lower attenuation of the optical link. In this way, the reason why the ONU is failed to be registered in the OLT may be rapidly located, so that the fault detection capability of the optical link may be effectively improved.

The serial numbers of the embodiments of the present disclosure are only used for describing and do not represent advantages and disadvantages of the embodiments.

It will be appreciated by anyone skilled in the art that all or part of steps of the embodiments may be completed by hardware and may also be completed by ordering relevant hardware by programs. The programs may be stored in a computer readable storage medium. The storage medium may be a read-only memory, a disk or a CD-ROM and the like.

The above embodiments are only preferred examples of the present disclosure and are not used for limiting the present disclosure. Any changes, equivalent replacement, improvement and the like made within the spirit and the principle of the present disclosure should be contained within the protection scope of the present disclosure.

What is claimed is:

1. An optical line termination (OLT) optical module comprises:
    an optical signal receiver to receive an uplink burst signal sent by an optical network unit (ONU);
    a trans-impedance amplifier comprising an input connected with the optical signal receiver;
    a limiting amplifier comprising an input connected with differential outputs of the trans-impedance amplifier;
    a D trigger comprising a clock input connected with a SD output of the limiting amplifier;
    a micro control unit comprising an input connected with the SD output of the limiting amplifier and an output connected with a reset signal input of the D trigger;
    a first switch tube comprising a control signal input connected with an output of the D trigger;
    a mirror current chip comprising an input connected with the optical signal receiver and an output connected with an input of the first switch tube; and
    a sample and hold circuit comprising an input connected with an output of the first switch tube and an output connected with a sample input of the micro control unit.

2. The OLT optical module according to claim 1, wherein the optical signal receiver is configured to output a response current when detecting an optical signal;
    the trans-impedance amplifier is configured to output differential electric signals according to the response current;
    the limiting amplifier is configured to output a SD signal according to the differential electric signals;
    the D trigger is configured to control the first switch tube to be in a conducting state according to the SD signal;
    the mirror current chip is configured to generate a mirror current according to the response current; and
    the first switch tube is configured to output the mirror current to the sample and hold circuit when being in the conducting state.

3. The OLT optical module according to claim 2, wherein the D trigger is configured to switch the output from a low level output to a high level output when receiving the SD signal; and
    the first switch tube is caused to be in the conducting state when receiving the high level output from the output of the D trigger.

4. An optical line termination (OLT), the OLT comprising:
    an OLT system device; and
    the OLT optical module according to claim 2, wherein the OLT system device is connected with the OLT optical module via the bus.

5. The OLT optical module according to claim 2, wherein the micro control unit is configured to start timing time according to the SD signal and output a reset signal to the D trigger when the timing time reaches a threshold;

the D trigger is configured to control the first switch tube to be in a cut-off state according to the reset signal; and the micro control unit is further configured to sample an electric signal held by the sample and hold circuit.

6. The OLT optical module according to claim 5, wherein the D trigger is configured to switch the output from a high level output to a low level output when receiving the reset signal; and the first switch tube is caused to be in the cut-off state when receiving the low level output from the output of the D trigger.

7. An optical line termination (OLT), the OLT comprising:

an OLT system device; and the OLT optical module according to claim 5, wherein the OLT system device is connected with the OLT optical module via the bus.

8. The OLT optical module according to claim 1, wherein the sample and hold circuit comprises:

a sampling capacitor comprising a first end connected with the output of the first switch tube and a second end being grounded, wherein the sampling capacitor is configured to be charged when the first switch tube is in a conducting state; and an operational amplifier comprising a non-inverting input connected with the first end of the sampling capacitor and an output connected with the sample input of the micro control unit, wherein the operational amplifier is configured to amplify a voltage cross the sampling capacitor and then output the amplified voltage to the micro control unit.

9. The OLT optical module according to claim 1, further comprises:

a sampling resistor comprising a first end connected with the output of the mirror current chip and a second end being grounded, wherein the sampling resistor is configured to convert a mirror current output by the mirror current chip into a charging voltage to be input into the sample and hold circuit.

10. The OLT optical module according to claim 1, further comprises:

a second switch tube connected in parallel with the first switch tube and comprising:

an input connected with the output of the mirror current chip;

an output connected with the input of the sample and hold circuit; and a control signal input connected with a MAC_Trigger signal output of an OLT system device.

11. The OLT optical module according to claim 10, wherein the second switch tube is caused to be in a conducting state and output a mirror current from the mirror current chip to the sample and hold circuit when receiving a MAC_Trigger signal from the OLT system device.

12. The OLT optical module according to claim 1, wherein the limiting amplifier is configured to:

detect whether amplitude of differential signals output by the differential outputs of the trans-impedance amplifier is greater than a predetermined threshold; and output a SD signal when the amplitude of the differential signals is greater than the predetermined threshold.

13. The OLT optical module according to claim 1, wherein the differential outputs of the trans-impedance amplifier are connected with the input of the limiting amplifier via coupling capacitors.

14. The OLT optical module according to claim 1, wherein the first switch tube is caused to be in a conducting state when the optical signal receiver detects an optical signal.

15. An optical line termination (OLT), the OLT comprising:

an OLT system device; and the OLT optical module according to claim 1, wherein the OLT system device is connected with the OLT optical module via a bus.

* * * * *